(12) United States Patent
Romandy

(10) Patent No.: US 12,083,454 B2
(45) Date of Patent: Sep. 10, 2024

(54) WATER PURIFICATION SYSTEM

(71) Applicants: Hamilton Beach Brands, Inc., Glen Allen, VA (US); Brita LP, Oakland, CA (US)

(72) Inventor: Mark K. Romandy, Goochland, VA (US)

(73) Assignees: BRITA LP, Neuchatel Ne (CH); HAMILTON BEACH BRANDS, INC., Glen Allen, VA (US)

( * ) Notice: Subject to any disclaimer, the term of this patent is extended or adjusted under 35 U.S.C. 154(b) by 386 days.

(21) Appl. No.: 17/721,998

(22) Filed: Apr. 15, 2022

(65) Prior Publication Data

US 2023/0330569 A1 Oct. 19, 2023

(51) Int. Cl.
*B01D 29/31* (2006.01)
*B01D 29/96* (2006.01)
*C02F 1/00* (2023.01)

(52) U.S. Cl.
CPC ............ *B01D 29/96* (2013.01); *B01D 29/31* (2013.01); *C02F 1/001* (2013.01); *B01D 2201/4076* (2013.01); *C02F 2307/10* (2013.01)

(58) Field of Classification Search
CPC ................. B01D 29/96; B01D 29/31; B01D 2201/4076; B01D 29/15; B01D 35/306; B01D 2201/303; B01D 35/30; C02F 1/001; C02F 2307/10; C02F 1/283; C02F 1/003

USPC .... 210/232, 235, 244, 257.1, 282, 440–445, 210/455, 466, 464, 481, 473, 449
See application file for complete search history.

(56) References Cited

U.S. PATENT DOCUMENTS

| | | | | |
|---|---|---|---|---|
| 4,842,724 | A * | 6/1989 | Bray | B67D 7/76 210/135 |
| 5,445,729 | A * | 8/1995 | Monroe | C02F 9/20 210/257.2 |
| 5,560,393 | A * | 10/1996 | Clack | B67D 3/0009 137/562 |
| 2008/0185323 | A1 * | 8/2008 | Kargenian | C02F 9/20 210/435 |
| 2018/0036659 | A1 * | 2/2018 | Reckin | B01D 27/08 |

* cited by examiner

*Primary Examiner* — Madeline Gonzalez
(74) *Attorney, Agent, or Firm* — Edell, Shapiro & Finnan, LLC

(57) ABSTRACT

A water purification system includes: a housing; a reservoir mounted to the housing and configured to hold and provide unfiltered water to the housing; a dispensing spout mounted to the housing and configured to dispense filtered water; and a filter assembly. The filter assembly includes: a filter unit with an inlet fluidly connected with the reservoir, and the outlet fluidly connected with the dispensing spout; a filter receptacle configured to connect the filter unit inlet with the reservoir and the filter unit outlet with the dispensing spout; and a locking yoke. The locking yoke is configured to move between a locked position, in which the locking yoke engages the filter unit and retains the filter unit in the receptacle, and an unlocked position, in which the locking yoke disengages from the filter unit to enable the filter unit to be removed from the receptacle.

20 Claims, 9 Drawing Sheets

WATER PURIFICATION SYSTEM

FIELD OF THE INVENTION

The present invention is directed generally to water purification devices, and more specifically to water purification devices with replaceable filters.

BACKGROUND

Water purification systems for home and light commercial use are known. Typically, such a system includes a filter with an inlet connected to a water source. The filter also has an outlet that leads to a dispenser, which often takes the form of a spout that dispenses water into a drinking glass, pitcher or similar vessel. A pump is present at some location between the source and the dispenser (e.g., between the outlet and the dispenser) to provide pressure to convey the water from the source to the dispenser through the filter.

The filter typically includes a filtration medium through which water passes. As water flows through the filter, the filtration medium removes certain impurities from the water. One exemplary filter media is activated carbon, which may be supplied either as loose carbon granules or as carbon block.

Ordinarily, water purification systems have relatively lengthy life spans, but operate most effectively when the filter is replaced periodically. As such, it may be useful to provide a configuration for a filter and its interface to the remainder of the water purification system that enables a used or spent filter to be easily and quickly removed and a replacement filter to be easily and quickly installed.

SUMMARY

As a first aspect, embodiments of the invention are directed to a water purification system. The water purification system comprises: a housing; a reservoir mounted to the housing and configured to hold and provide unfiltered water to the housing; a dispensing spout mounted to the housing and configured to dispense filtered water; and a filter assembly mounted within the housing. The filter assembly comprises: a filter unit with an inlet and an outlet, the inlet being fluidly connected with the reservoir, and the outlet being fluidly connected with the dispensing spout; a filter receptacle removably mounted to the housing, the filter receptacle configured to connect the filter unit inlet with the reservoir and the filter unit outlet with the dispensing spout when the filter unit is mounted in the filter receptacle; and a locking yoke movably mounted to the filter receptacle. The locking yoke is configured to move between a locked position, in which the locking yoke engages the filter unit and retains the filter unit in the receptacle, and an unlocked position, in which the locking yoke disengages from the filter unit to enable the filter unit to be removed from the receptacle.

As a second aspect, embodiments of the invention are directed to a water purification system comprising: a housing; a reservoir mounted to the housing and configured to hold and provide unfiltered water to the housing; a dispensing spout mounted to the housing and configured to dispense filtered water; and a filter assembly mounted within the housing. The filter assembly comprises: a filter unit with an inlet and an outlet, the inlet being fluidly connected with the reservoir, and the outlet being fluidly connected with the dispensing spout, wherein the filter unit includes a pair of radially-extending tabs disposed on opposite sides thereof; a filter receptacle removably mounted to the housing, the filter receptacle configured to connect the filter unit inlet with the reservoir and the filter unit outlet with the dispensing spout when the filter unit is mounted in the filter receptacle; and a locking yoke movably mounted to the filter receptacle. The locking yoke includes two splayed arms, each arm including a radially-extending hook that supports one of the tabs of the filter unit in the locked position, the locking yoke configured to move between a locked position, in which the hooks of the locking yoke engage the tabs of the filter unit and retain the filter unit in the receptacle, and an unlocked position, in which the hooks of the locking yoke disengage from the tabs of the filter unit to enable the filter unit to be removed from the receptacle.

As a third aspect, embodiments of the invention are directed to a water purification system comprising: a housing; a reservoir mounted to the housing and configured to hold and provide unfiltered water to the housing; a dispensing spout mounted to the housing and configured to dispense filtered water; and a filter assembly mounted within the housing. The filter assembly comprises: a filter unit with an inlet and an outlet that is separate and distinct from the inlet, the inlet being fluidly connected with the reservoir, and the outlet being fluidly connected with the dispensing spout; a filter receptacle removably mounted to the housing, the filter receptacle configured to connect the filter unit inlet with the reservoir and the filter unit outlet with the dispensing spout when the filter unit is mounted in the filter receptacle; and a locking yoke movably mounted to the filter receptacle. The locking yoke is configured to move between a locked position, in which the locking yoke engages the filter unit and retains the filter unit in the receptacle, and an unlocked position, in which the locking yoke disengages from the filter unit to enable the filter unit to be removed from the receptacle. The filter unit includes a first flat generally vertical surface, and the filter receptacle includes a second flat generally vertical surface. The first flat generally vertical surface confronts the second flat generally vertical surface when the filter unit is mounted in the receptacle.

DETAILED DESCRIPTION

Figure 1:
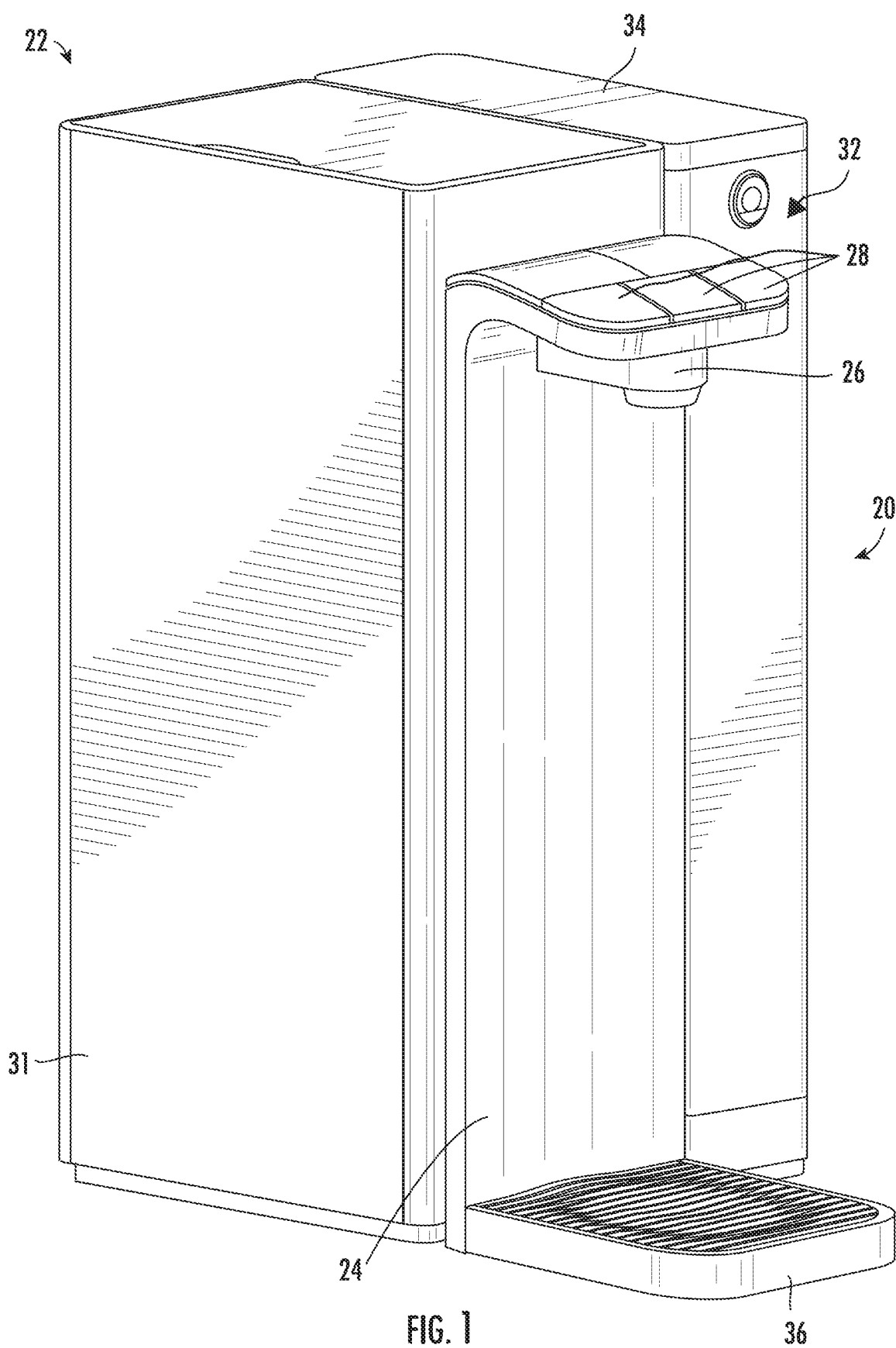
FIG. 1 is a perspective view of a water purification system according to embodiments of the invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Referring now to the drawings, a water purification system, designated broadly at 20, is shown therein. The water purification system 20 includes an overall generally box-shaped housing 22 that houses most of the components. A spout 26 extends forwardly from a front wall 24 of the housing 22. Selection buttons 28 are present on the upper surface of the spout 26. The housing 22 also includes two side walls 30, 31. The side wall 31 covers the filtration chamber, and is configured to be easily removable for replacement of the filter unit 58, as discussed in greater detail below. The side wall 30 (FIG. 3) is opposite the side wall 31 and serves as a divider between the housing 22 and an adjacent water reservoir 32 (which is covered by a removable cap 34). A drip tray 36 extends from the lower portions of the front wall 24 and is configured to support vessels (such as glasses and cups) into which water is dispensed and to collect drips from the dispenser).

Figure 2:
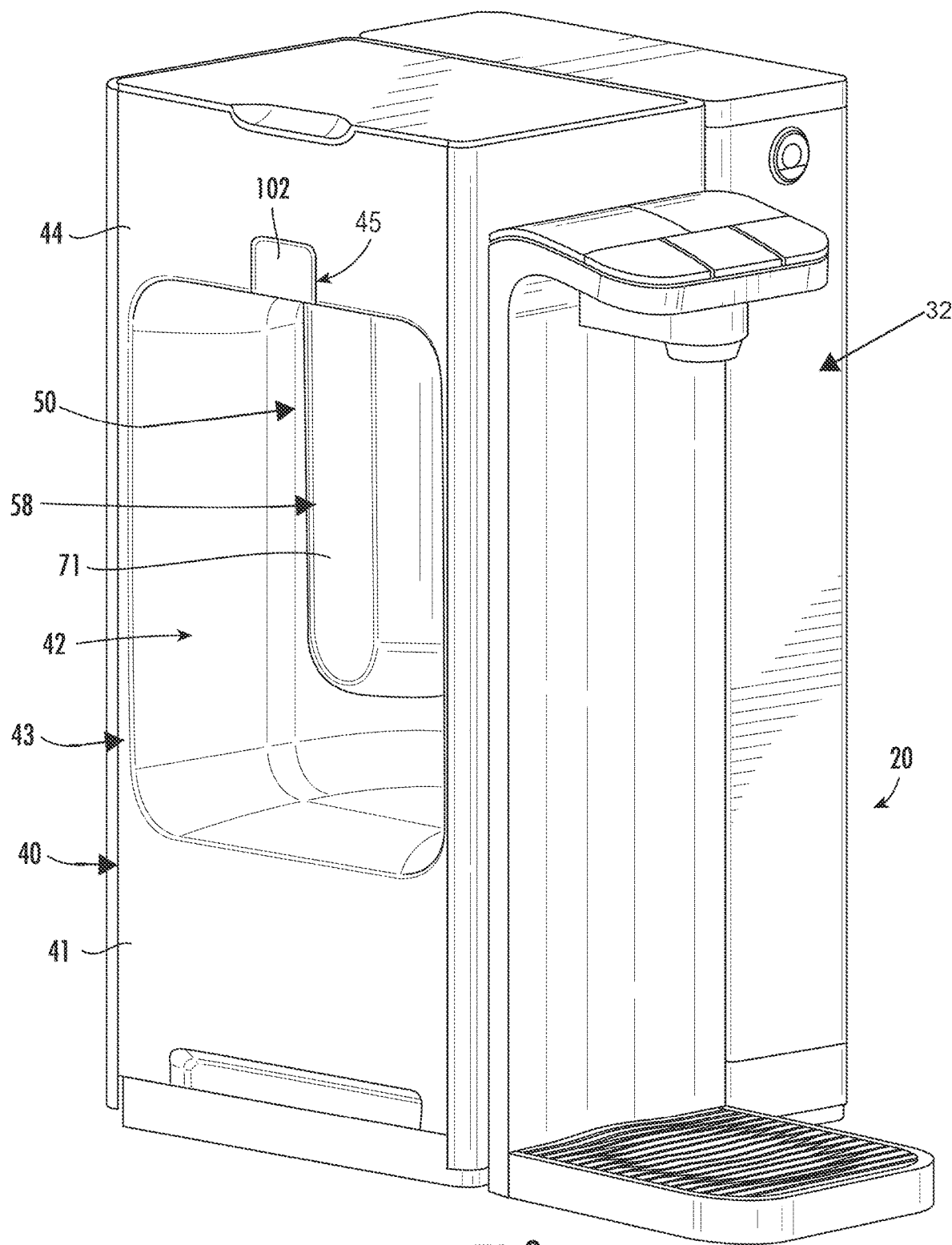
FIG. 2 is a perspective view of the water purification system of FIG. 1 with one of the side walls removed.

Referring now to FIG. 2, in which the side wall 31 is removed, a filter chamber liner 40 is visible. The filter chamber liner 40 has a lower panel 41, a middle section 43 with a large pocket 42 in which the filter unit 58 resides, and an upper panel 44. As can be envisioned by comparing FIG. 2 with FIGS. 3 and 4, the lower panel 41 covers a pump 46 and assorted plumbing lines. The upper panel 44 covers the upper portion of the filter assembly 50 and assorted plumbing lines. The middle section 43 provides space in the pocket 42 for the filter unit 58, and also covers plumbing and electronics positioned adjacent the front wall 24. The pocket 42 also includes a large opening (not shown) in its upper surface that receives the upper end of the filter unit 58.

Figure 3:
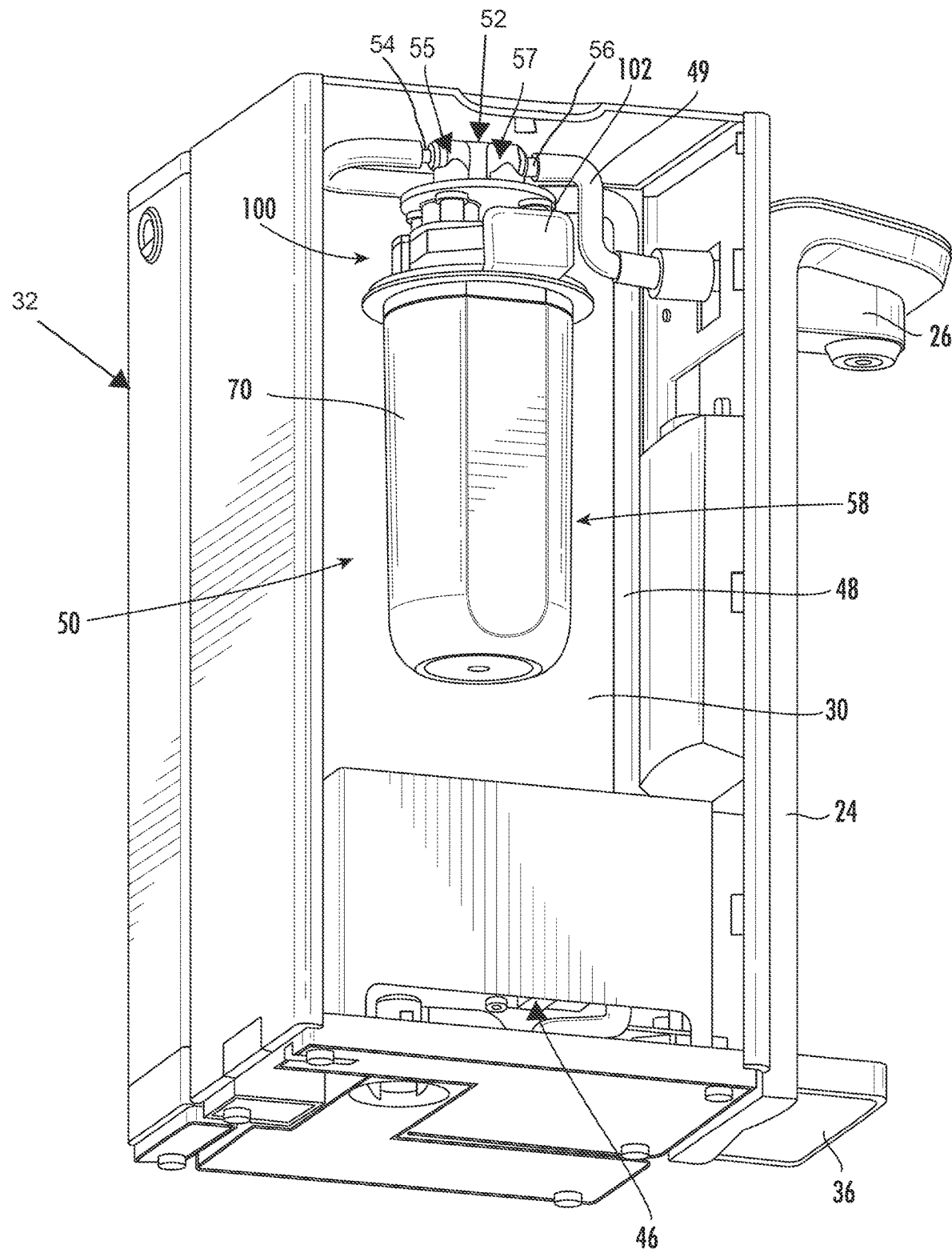
FIG. 3 is a perspective view of the water purification system of FIG. 1 with the side wall and filter liner removed.
Figure 4:
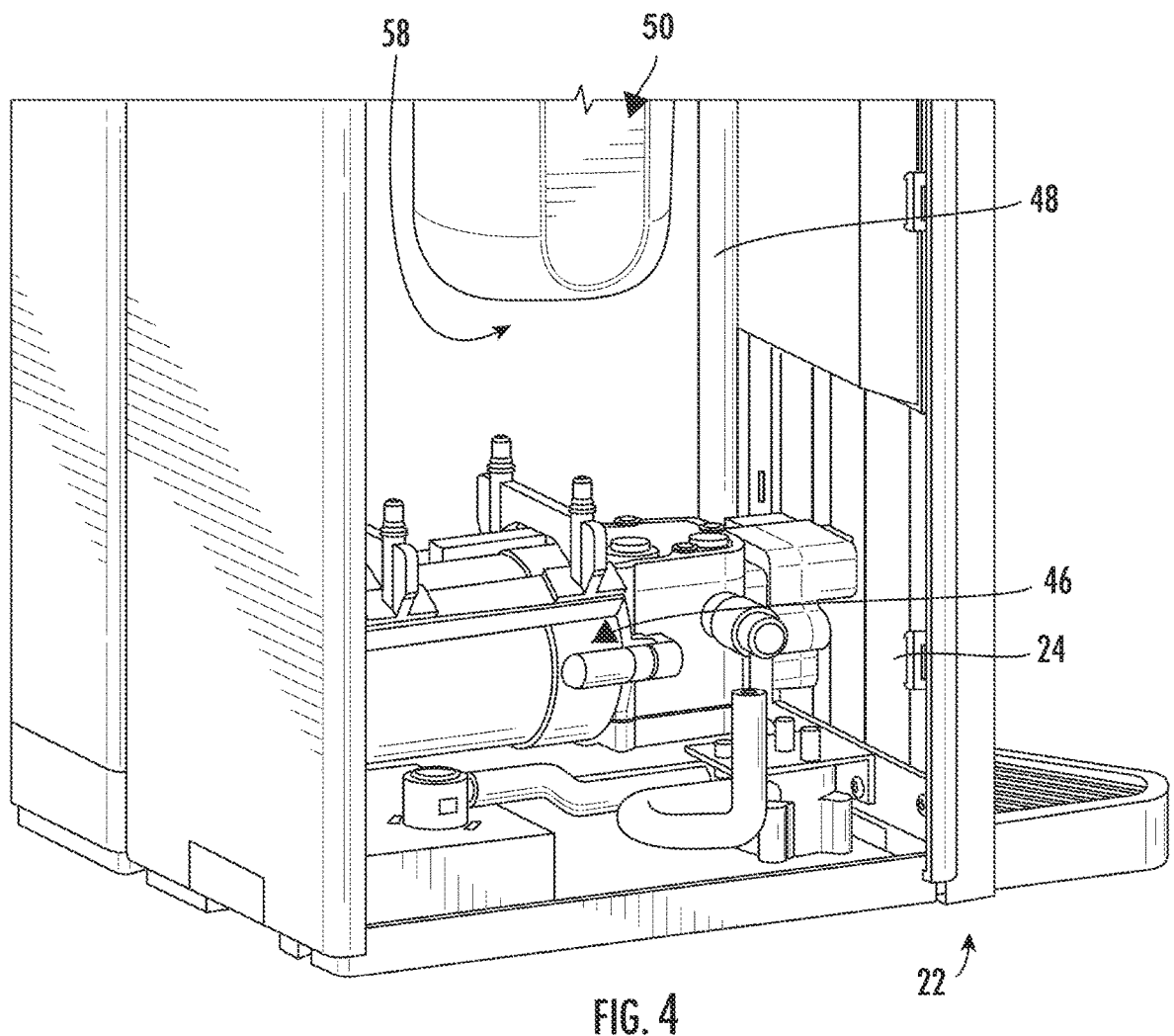
FIG. 4 is a partial perspective view of the water purification system of FIG. 1 showing the pump.

Referring now to FIG. 3, in which the filter chamber liner 40 is also removed, and FIG. 4, in which a pump shield is also removed, it can be seen that the pump 46 is located in the lower region of the housing 22. A line 48 extends from the pump 46 to the inlet 54 of the filter assembly 50, and a line 49 extends from the outlet 56 of the filter assembly 50 to the spout 26 (shown in FIG. 3). The pump 46 is electrically connected (typically through a controller or processor) to a power source (typically through a power cord or the like) and to the selection buttons 28.

Figure 5:
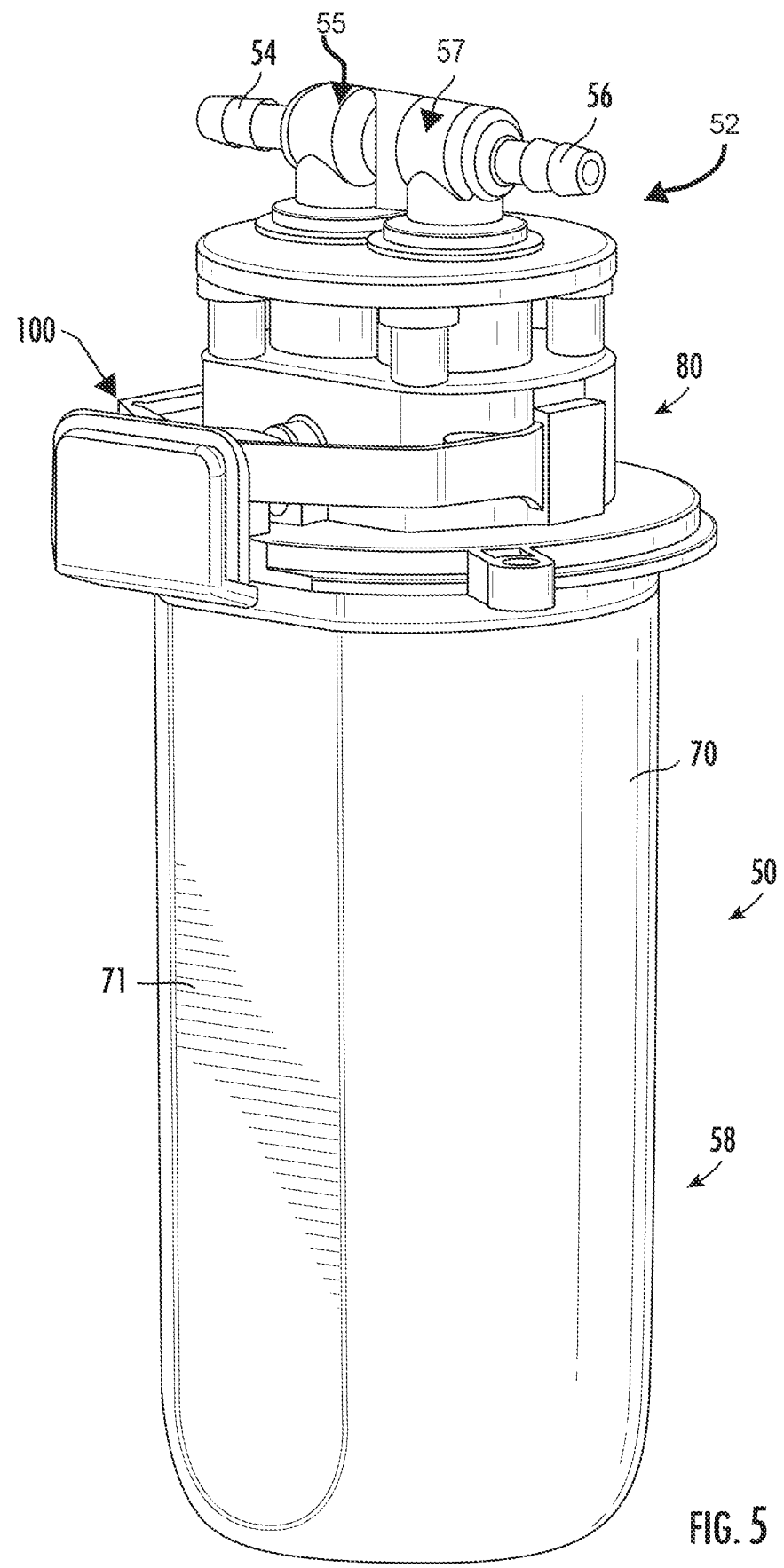
FIG. 5 is a perspective view of the water filter assembly of FIG. 1.
Figure 13:
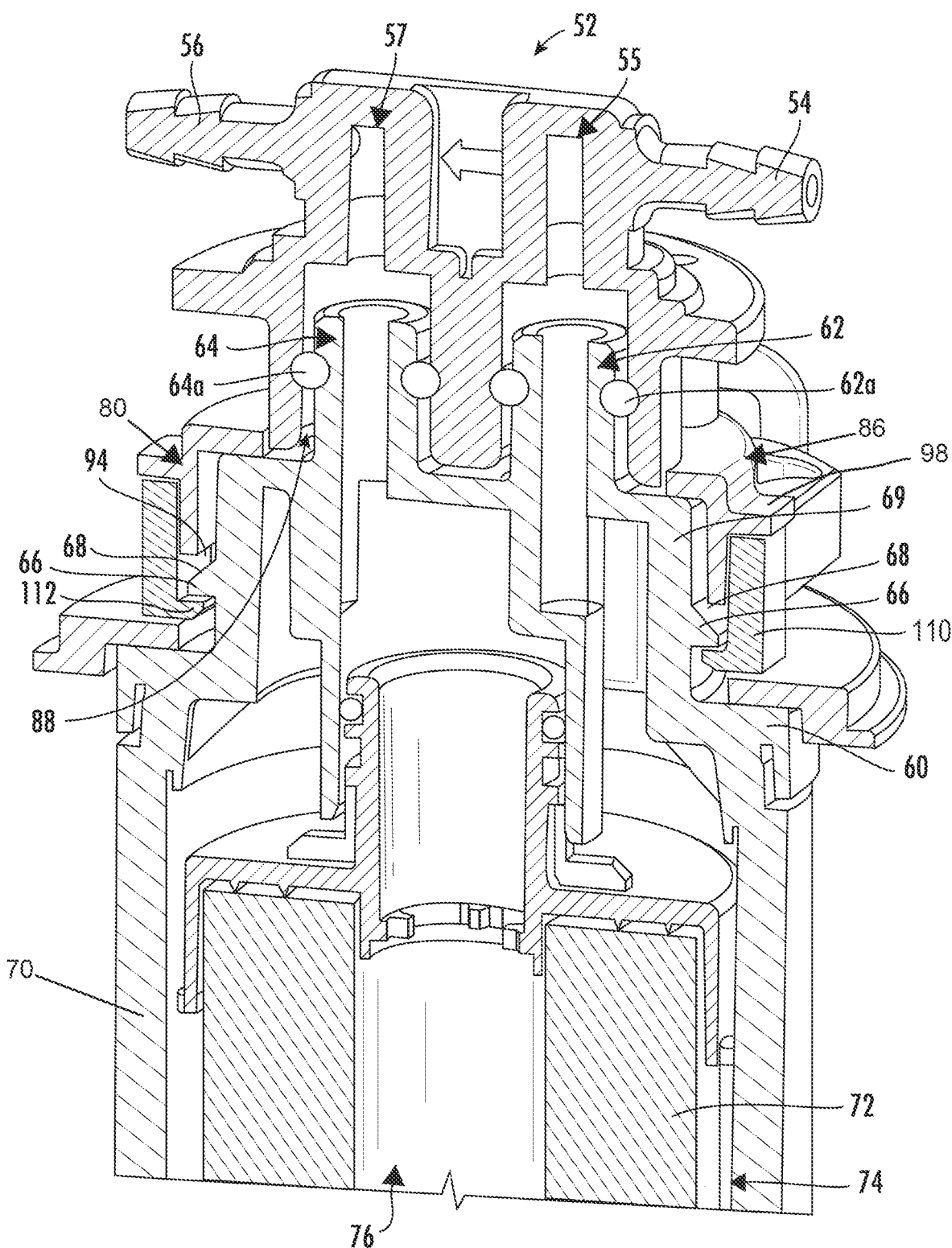
FIG. 13 is a section view of the water filter assembly of FIG. 5.

Referring now to FIG. 5, the filter assembly 50 includes the aforementioned filter unit 58, a fitting 52, a filter receptacle 80, and a locking yoke 100. The fitting 52 includes the inlet 54, which receives unfiltered water from the pump 46 via the line 48, and the outlet 56, which supplies filtered water to the spout 26 via the line 49. As shown in FIG. 13, the fitting 52 has an inlet chamber 55 that provides unfiltered water from the inlet 54 to the filter unit 58, and an outlet chamber 57 that conveys filtered water from the filter unit 58 to the outlet 56.

Figure 9:
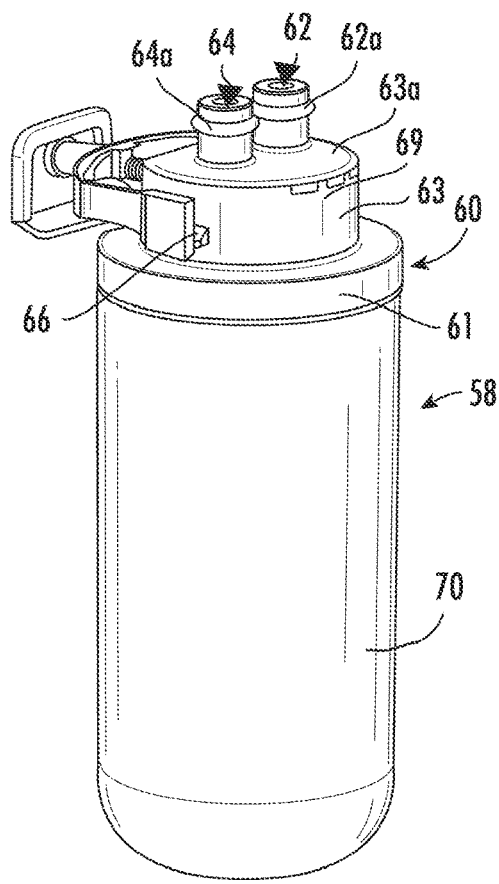
FIG. 9 is a perspective view of the filter unit and the locking yoke of the water filter unit of FIG. 5.
Figure 10:
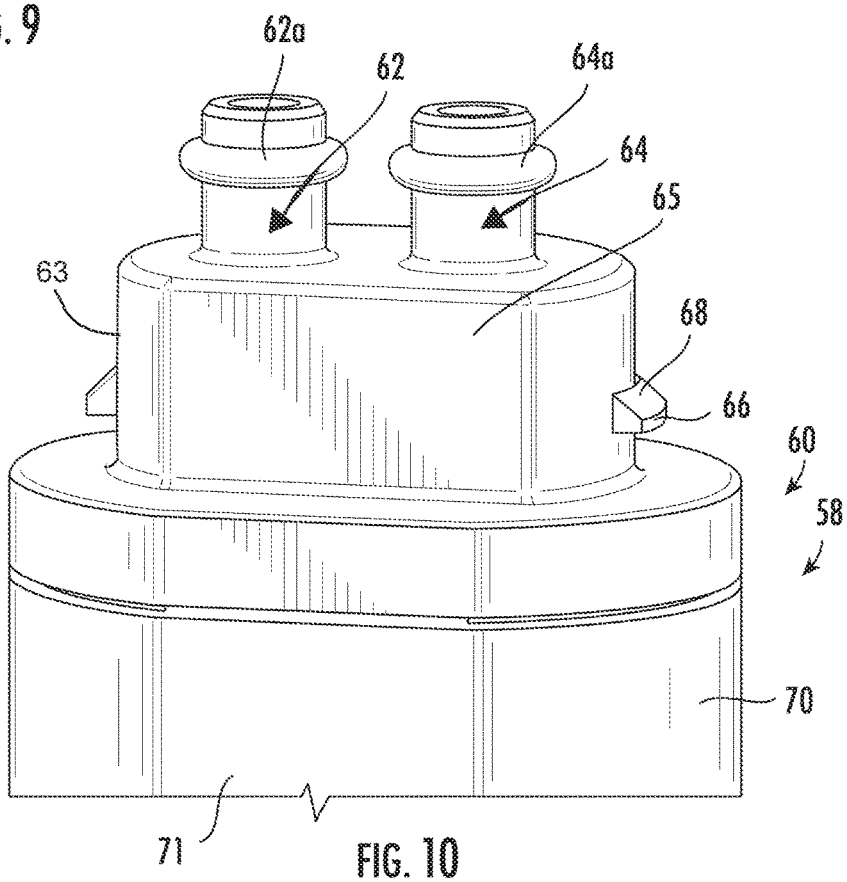
FIG. 10 is a partial front view of the upper end of the filter unit of the water filter assembly of FIG. 5.

Referring now to FIGS. 5, 9 and 10, the filter unit 58 includes a cover 60 that is positioned atop a filter housing 70. The cover 60 is generally circular and has a stepped configuration, with a lower ring 61 and an upper ring 63. An inlet 62 and an outlet 64 extend upwardly from the upper surface 63a of the upper ring 63; each of the inlet 62 and the outlet 64 is encircled by a respective O-ring 62a, 64a. The vertical wall 69 of the upper ring 63 includes two diametrically-opposed tabs 66 that extend radially outwardly. Each of the tabs 66 has an upper beveled surface 68. Also, the upper ring 63 has a flat vertical surface 65 that defines a chord across the upper ring 63.

Referring still to FIGS. 5, 9 and 10, the filter housing 70 is generally cylindrical, but includes a flat front face 71 that is parallel with the flat vertical surface 65 of the cover 60. As shown in FIG. 13, the filter housing 70 includes a filtration cylinder 72 formed of a filtration medium, such as carbon block. The filtration cylinder 72 defines an inner chamber 76. An outer gap 74 is formed between the outer surface of the filtration cylinder 72 and the inner surface of the filter housing 70.

It can be envisioned from FIGS. 3, 4 and 13 that, when one of the selection buttons 28 is depressed, the pump 46 activates, which impels unfiltered water to flow through the inlet 54 of the fitting 52, enter the inlet 62 of the cover 60, and flow therefrom into the outer gap 74. Water then flows through the filtration cylinder 72, where it is filtered, to the inner chamber 76. Filtered water flows from the inner chamber 76 to the outlet 64 of the cover 60, then to the outlet 56 of the fitting 52, to line 49 and out through the spout 26.

Figure 6:
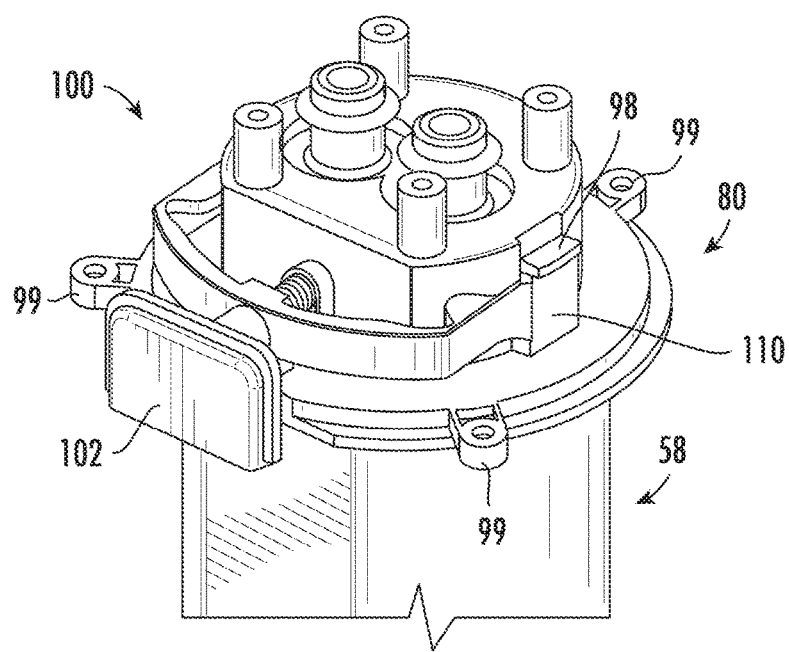
FIG. 6 is a partial perspective view of the upper end of the water filter assembly of FIG. 5.
Figure 7:
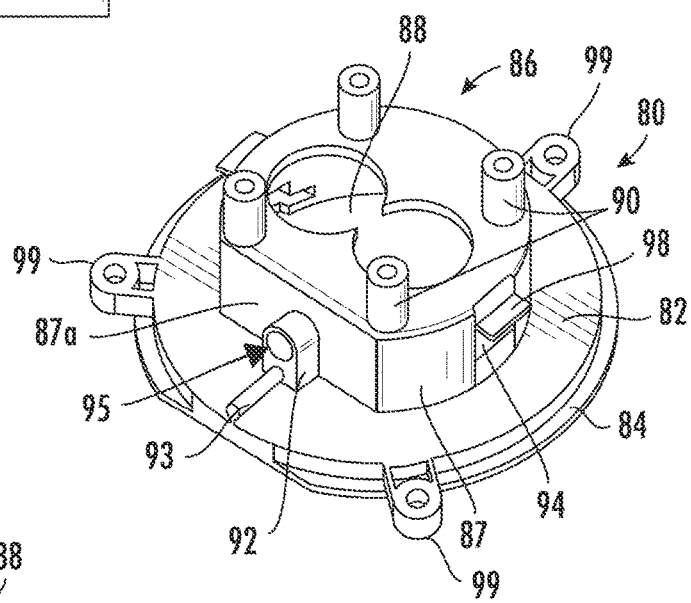
FIG. 7 is a perspective view of the filter receptacle of the water filter assembly of FIG. 5.
Figure 8:
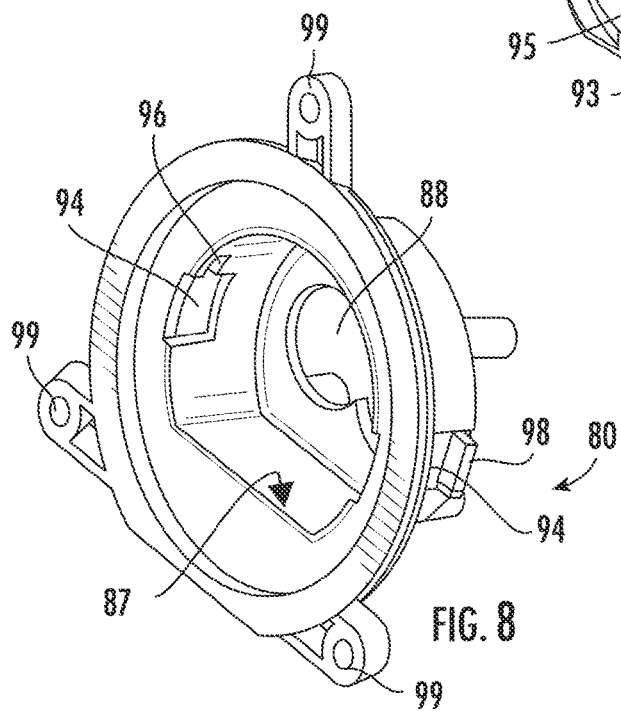
FIG. 8 is a reverse perspective view of the filter receptacle of FIG. 7.

The filter unit 58 is maintained in position by the filter receptacle 80 and the locking yoke 100. As shown in FIGS. 6-8, the filter receptacle 80 is generally cylindrical, with a stepped configuration that generally matches that of the filter cover 60. The filter receptacle 80 has an outer ring 82 with a lip 84, and an upper section 86. A figure-8 shaped hole 88 is located in the upper section 86. The upper section 86 also has a vertical wall 87 with a flat vertical surface 87a that defines a chord across the upper section 86. A block 92 extends radially outwardly, or perpendicularly, from the flat vertical surface 87a, with a post 93 extending forwardly from the block 92 and a bore 95 extending rearwardly into the block 92. Four bosses 90 extend upwardly from the upper section 86 to enable the filter receptacle 80 to be mounted to the fitting 52.

Also, as seen in FIGS. 7 and 8, a generally rectangular window 94 is present in the vertical wall 87 of the upper section 86 and extends slightly into the outer ring 82. A slot 96 extends rearwardly from the window 94. An overhanging stop 98 extends radially outwardly from the vertical wall 87 above each window 94.

The filter receptacle 80 is mounted above the opening in the upper surface of the pocket 42 of the filter chamber liner 40. Mounting may be achieved by, for example, screws inserted into ears 99 (FIGS. 6 and 7).

Figure 11:
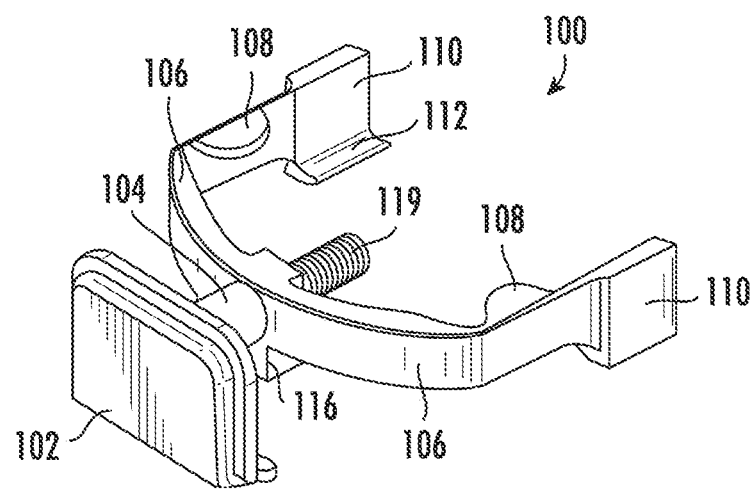
FIG. 11 is a front perspective view of the locking yoke of the water filter assembly of FIG. 5.
Figure 12:
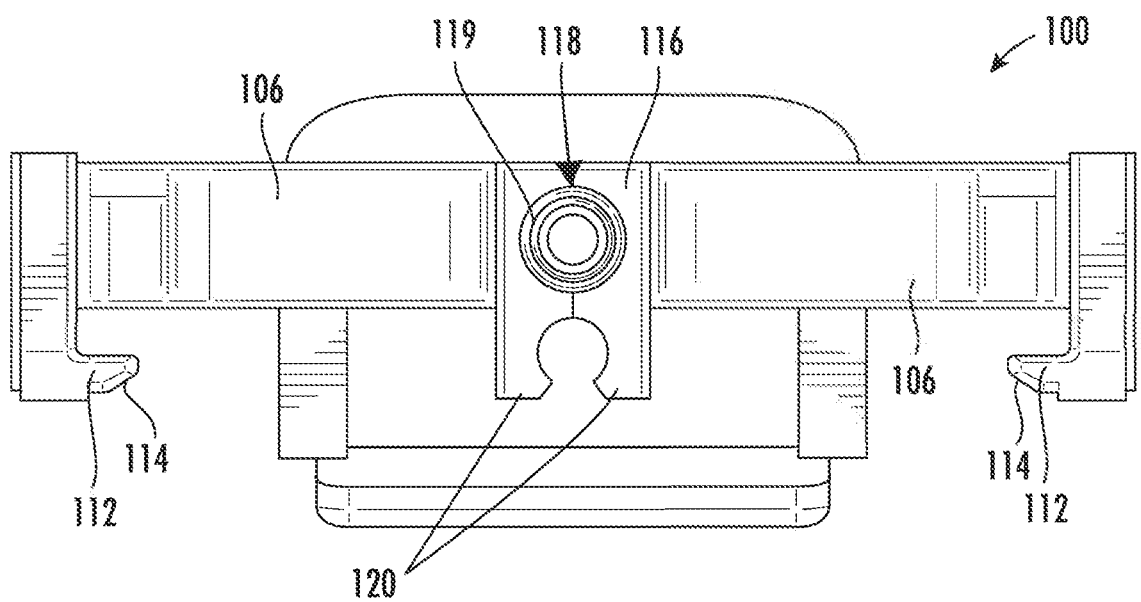
FIG. 12 is a rear view of the locking yoke of FIG. 11.

The locking yoke 100 (FIGS. 11 and 12) includes a rod, or shaft, 104 that has a push button 102 mounted on one end. Two arms 106 are mounted on the opposite end of the rod 104. Each arm 106 extends in an outward arc from the shaft 104, then extends rearwardly to terminate in a catch member 110. A semicircular deflector 108 extends inwardly from each arm 106. A hook 112 extends inwardly from the lower edge of each catch member 110; each hook 112 has a lower beveled surface 114.

The locking yoke 100 also includes a block 116 that extends rearwardly from the intersection of the arms 106 and the rod 104. A bore 118 extending through at least a portion of the block 118 is open to the rear of the block 116 and houses a spring 119. Clip fingers 120 extend downwardly from the block 116.

As can be envisioned in FIGS. 6, 7, 9, 12 and 13, the locking yoke 100 is positioned so that the clip fingers 120 capture the post 93 of the filter receptacle 80, and the catch members 110 are positioned below the stops 98. In this position, the hooks 112 extend though their respective windows 94 in the filter receptacle, with the beveled surfaces 114 facing downwardly. Also, the spring 119 extends from the bore 118 into the bore 95; the spring 119 is selected so that it is in compression in this position, thereby "spring-loading" the locking yoke 100. The push button 102 is forced against the inner surface of the upper panel 44 of the filter chamber liner 40 and is accessible through a small opening 45 therein (FIG. 2).

As can be seen in FIGS. 5, 6 and 13, the filter unit 58 is mounted in the water purification system 20 by interaction between the cover 60, the receptacle 80, and the locking yoke 100. More specifically, the filter unit 58 can be installed by first orienting the filter unit 58 so that the flat front face 71 faces forwardly, then raising the filter unit 58 into the filter receptacle 80 so that the inlet 62 and outlet 64 pass through the "lobes" of the hole 88 in the filter receptacle 80, and so that the flat vertical surface 65 of the cover 60 confronts the flat vertical surface 87a of the receptacle 80 (which ensures correct orientation). Continued ascension of the filter unit 58 causes the inlet 62 and the outlet 64 to enter and connect with, respectively, the inlet chamber 55 and the outlet chamber 57 of the fitting 52 (the O-rings 62a, 64a provide seals to these joints). As the filter unit 58 continues to rise, the beveled surfaces 68 of the tabs 66 engage the beveled surfaces 114 of the hooks 112 of the locking yoke 100, thereby forcing the hooks 112, and in turn the arms 106 of the locking yoke 100, outwardly. It can also be seen that the stops 98 engage the upper edges of the catch members 110, which maintains the catch members 110 at the same elevation when the tabs 66 are pressing upwardly on the hooks 112. Once the tabs 66 have "cleared" the hooks 112, the arms 106 recover inwardly from this deflection so that the hooks 112 underlie the tabs 66, thus supporting the filter unit 58 from underneath.

The filter unit 58 can be removed (e.g., when it is spent) by pressing the push button 102 inwardly (i.e., toward the filter receptacle 80). This action forces the locking yoke 100 rearwardly (i.e., toward the water reservoir 32). As the locking yoke 100 moves rearwardly, the deflectors 108 engage the vertical wall 87 of the upper section 86 of the filter receptacle 80, which engagement forces the catch members 110 outwardly (i.e., away from the windows 94). This action draws the hooks 112 radially outwardly. Also, the rearward movement of the locking yoke 100 forces the hooks 112 into the slot 96, which maintains the hooks 112 at their desired elevation. Once the hooks 112 move outwardly a sufficient distance to clear the tabs 66 of the filter unit 58, the filter unit 58 is free to be lowered away from the filter receptacle 80 and can be removed. The push button 102 can be released, and the spring 119 forces the locking yoke 100 back into its original position, where it is then prepared to receive a replacement filter unit 58 in the manner described above.

Those skilled in this art will appreciate that the water purifier 20 may take other forms. For example, instead of both tabs 66 and both hooks 112 having beveled surfaces, only one of each may have beveled surfaces, such that one unbeveled tab 66 and one unbeveled hook 112 could be engaged as the filter unit 58 is tilted, and as the filter unit 58 is pivoted to vertical, the beveled tab 66 and hook 112 would engage and clear in the manner discussed above.

As another example, the locking yoke 100 may move in the opposite direction (i.e., forwardly) to release a mounted filter unit 58. With this embodiment, the deflectors 108 could be omitted. The slot 96 (if included) would be on the opposite side of each window 94. The push button 102 would be replaced with a structure, like a handle, that could be easily pulled rather than pushed. Also, the spring may be a tension spring that draws the locking yoke toward the mounted filter unit 58.

As a further example, in some embodiments the filter unit 58 may have a single port (rather than separate ports) for the inlet and outlet. As one example, the filter unit may have a concentric inlet/outlet arrangement (e.g., an inner outlet and an annular inlet that encircles the outlet). In such an embodiment, the receptacle and fitting may be modified to receive only a single port. It may also be envisioned that, in some embodiments, the fitting and receptacle may be formed as a single unitary component in which the filter unit 58 can be mounted and connected with the reservoir and the dispenser.

As one more example, the flat vertical surfaces 65, 87*a* of the cover 60 and receptacle 80 may be canted somewhat (i.e., they may be generally vertical) and still provide proper orientation for the filter unit 58.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. A water purification system, comprising:
 a housing;
 a reservoir mounted to the housing and configured to hold and provide unfiltered water to the housing;
 a dispensing spout mounted to the housing and configured to dispense filtered water; and
 a filter assembly mounted within the housing, the filter assembly comprising:
  a filter unit with an inlet and an outlet, the inlet being fluidly connected with the reservoir, and the outlet being fluidly connected with the dispensing spout;
  a filter receptacle removably mounted to the housing, the filter receptacle configured to connect the filter unit inlet with the reservoir and the filter unit outlet with the dispensing spout when the filter unit is mounted in the filter receptacle; and
  a locking yoke movably mounted to the filter receptacle, the locking yoke configured to move between a locked position, in which the locking yoke engages the filter unit and retains the filter unit in the filter receptacle, and an unlocked position, in which the locking yoke disengages from the filter unit to enable the filter unit to be removed from the filter receptacle.

2. The water purification system defined in claim 1, further including a biasing member that biases the locking yoke toward the locked position.

3. The water purification system defined in claim 1, wherein the filter unit includes a pair of radially-extending tabs disposed on opposite sides thereof, and wherein the locking yoke includes a pair of radially-extending hooks that support the pair of radially-extending tabs in the locked position.

4. The water purification system defined in claim 3, wherein each tab of the pair of radially-extending tabs includes an upwardly-facing beveled surface, and wherein each hook of the pair of radially-extending hooks includes a downwardly-facing beveled surface.

5. The water purification system defined in claim 3, wherein the filter receptacle includes a pair of diametrically-opposed windows, and wherein each tab of the pair of radially-extending tabs engages a corresponding hook of the pair of radially-extending hooks within a corresponding window.

6. The water purification system defined in claim 5, wherein each window of the pair of diametrically-opposed windows merges with a slot positioned to at least partially receive the corresponding hook in the unlocked position.

7. The water purification system defined in claim 3, wherein the locking yoke includes two splayed arms, and wherein each arm of the two splayed arms includes a deflector that engages the filter receptacle to cause the pair of radially-extending hooks to move radially outwardly in the unlocked position.

8. The water purification system defined in claim 1, wherein the inlet and the outlet of the filter unit are defined by separate ports.

9. The water purification system defined in claim 1, wherein the filter unit includes a first flat generally vertical surface, and the filter receptacle includes a second flat generally vertical surface, and wherein the first flat generally vertical surface confronts the second flat generally vertical surface when the filter unit is mounted in the filter receptacle.

10. The water purification system defined in claim 1, further comprising a fitting mounted to the filter receptacle, wherein the fitting is configured to convey water between the reservoir and the filter unit inlet, and between the filter unit outlet and the dispensing spout.

11. A water purification system, comprising:
 a housing;
 a reservoir mounted to the housing and configured to hold and provide unfiltered water to the housing;
 a dispensing spout mounted to the housing and configured to dispense filtered water; and
 a filter assembly mounted within the housing, the filter assembly comprising:
  a filter unit with an inlet and an outlet, the inlet being fluidly connected with the reservoir, and the outlet being fluidly connected with the dispensing spout, wherein the filter unit includes a pair of radially-extending tabs disposed on opposite sides thereof;
  a filter receptacle removably mounted to the housing, the filter receptacle configured to connect the filter unit inlet with the reservoir and the filter unit outlet with the dispensing spout when the filter unit is mounted in the filter receptacle; and
  a locking yoke movably mounted to the filter receptacle, the locking yoke including two splayed arms, each arm including a radially-extending hook that supports one of the tabs of the filter unit when in a locked position, the locking yoke configured to move between the locked position, in which the hooks of the locking yoke engage the tabs of the filter unit and retain the filter unit in the filter receptacle, and an unlocked position, in which the hooks of the locking yoke disengage from the tabs of the filter unit to enable the filter unit to be removed from the filter receptacle.

12. The water purification system defined in claim 11, further including a biasing member that biases the locking yoke toward the locked position.

13. The water purification system defined in claim 11, wherein the filter receptacle includes a pair of diametrically-opposed windows, and wherein each tab engages a respective hook within a respective window.

14. The water purification system defined in claim 11, wherein each arm further includes a deflector that engages the filter receptacle to cause the hooks to move radially outwardly in the unlocked position.

15. The water purification system defined in claim 11, wherein the inlet and the outlet of the filter unit are defined by separate ports.

16. The water purification system defined in claim 11, wherein the filter unit includes a first flat generally vertical surface, and the filter receptacle includes a second flat generally vertical surface, and wherein the first flat generally vertical surface confronts the second flat generally vertical surface when the filter unit is mounted in the filter receptacle.

17. The water purification system defined in claim 11, wherein the inlet and the outlet of the filter unit are defined by separate ports.

18. The water purification system defined in claim 11, further comprising a fitting mounted to the filter receptacle, wherein the fitting is configured to convey water between the reservoir and the filter unit inlet, and between the filter unit outlet and the dispensing spout.

19. A water purification system, comprising:
a housing;
a reservoir mounted to the housing and configured to hold and provide unfiltered water to the housing;
a dispensing spout mounted to the housing and configured to dispense filtered water; and
a filter assembly mounted within the housing, the filter assembly comprising:
a filter unit with an inlet and an outlet that is separate and distinct from the inlet, the inlet being fluidly connected with the reservoir, and the outlet being fluidly connected with the dispensing spout;
a filter receptacle removably mounted to the housing, the filter receptacle configured to connect the filter unit inlet with the reservoir and the filter unit outlet with the dispensing spout when the filter unit is mounted in the filter receptacle; and
a locking yoke movably mounted to the filter receptacle, the locking yoke configured to move between a locked position, in which the locking yoke engages the filter unit and retains the filter unit in the filter receptacle, and an unlocked position, in which the locking yoke disengages from the filter unit to enable the filter unit to be removed from the filter receptacle;
wherein the filter unit includes a first flat generally vertical surface, and the filter receptacle includes a second flat generally vertical surface, and wherein the first flat generally vertical surface confronts the second flat generally vertical surface when the filter unit is mounted in the receptacle.

20. The water purification system defined in claim 19, wherein the inlet and the outlet of the filter unit are defined by separate ports.

* * * * *